Jan. 3, 1950　　　　G. L. JOHNSON　　　　2,493,672
APPARATUS FOR HYDROCARBON CONVERSION
Filed April 17, 1946　　　　　　　　　　3 Sheets-Sheet 3
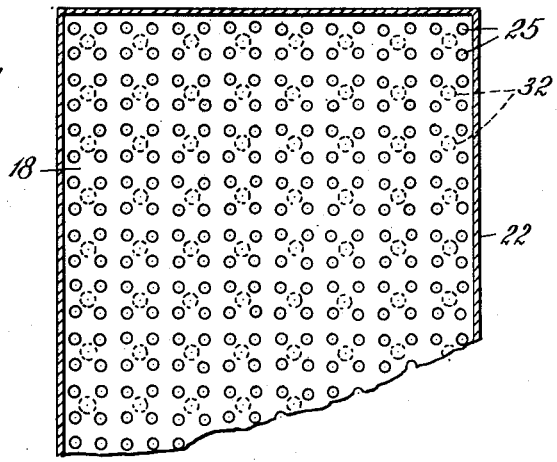
Fig. 3,
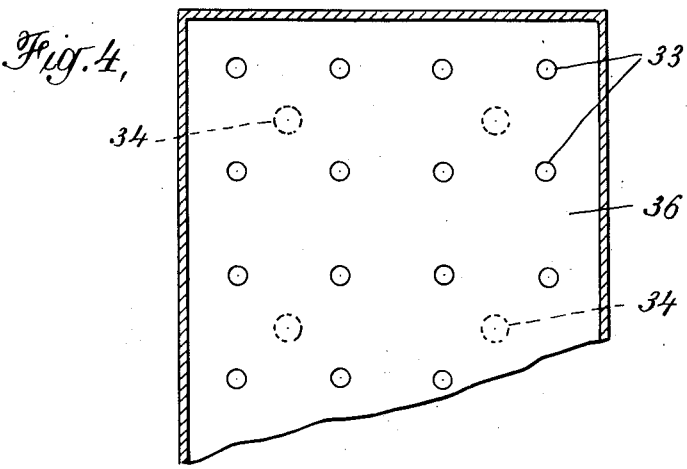
Fig. 4,
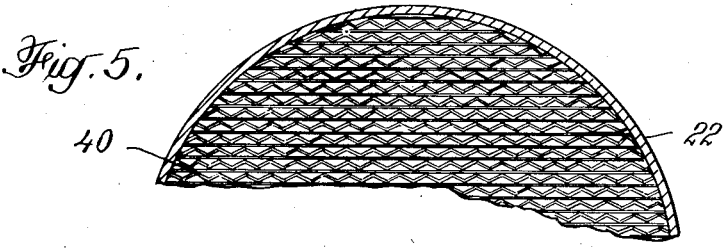
Fig. 5.
INVENTOR
GEORGE L. JOHNSON
BY
John A. Crowley, Jr.
AGENT OR ATTORNEY Patented Jan. 3, 1950

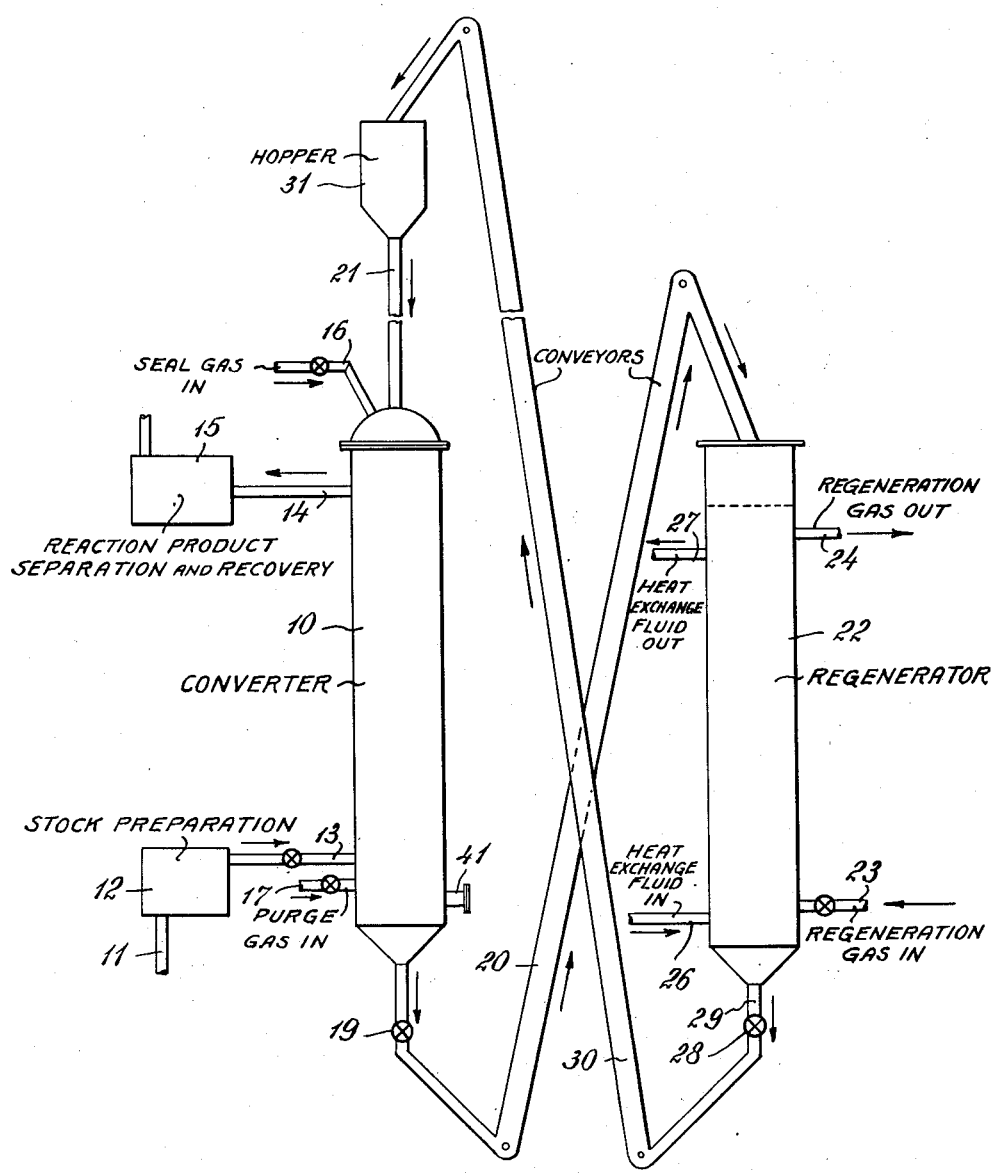

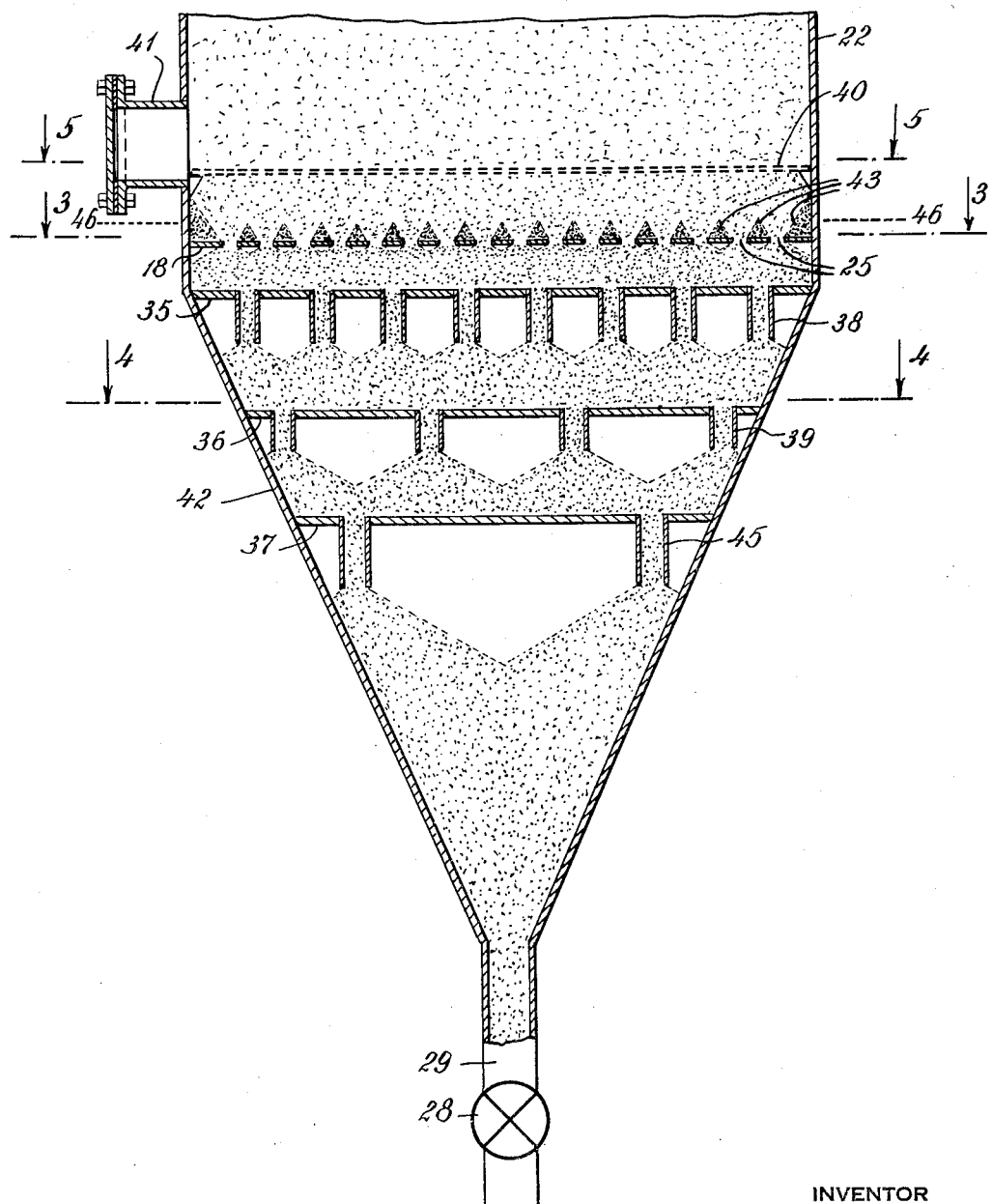

2,493,672

UNITED STATES PATENT OFFICE 2,493,672

APPARATUS FOR HYDROCARBON CONVERSION

George L. Johnson, New York, N. Y., assignor to Socony-Vacuum Oil Company, Incorporated, a corporation of New York Application April 17, 1946, Serial No. 662,691

5 Claims. (Cl. 23—288)

This invention has to do with apparatus for contracting gaseous materials with a moving mass of particle form solid material. Exemplary of the processes for which it may be used are gas-adsorption, gas purification, gas-solid heat exchange, the treatment of solid materials, ore roasting and the thermal or catalytic conversion of gaseous materials or materials resulting in gaseous products. An important application is the catalytic conversion of hydrocarbons, it being well known, for example, that petroleum gas oils boiling within the range of about 450° F. to 800° F. upon being contacted with certain solid adsorbent materials at temperatures usually above about 800° F. and pressures usually above atmospheric may be converted to lower boiling products containing gasoline. Such a process may be conducted continuously by passing a particle form catalytic material as a substantially compact column cyclically through a conversion zone wherein it is contacted with hydrocarbon reactants to effect the conversion thereof and through a separate regeneration zone wherein it is contacted with a combustion supporting gas acting to burn off of said catalytic material carbonaceous contaminants deposited thereon during the hydrocarbon conversion.

The catalytic material in such a conversion process may take the form of natural or treated clays, bauxites, alumina, inert carriers having certain metallic oxides deposited thereon or synthetic associations of silica, alumina or silica and alumina to which may be added small amounts of other materials such as certain metallic oxides for special purposes. Such catalytic materials when employed in a process wherein they pass through conversion and regeneration zones as substantially compact columns or beds may range in particle size from about 4 to 100 mesh and preferably from about 4 to 8 mesh as measured by Tyler standard screen analysis.

This invention is specifically directed to an improvement in apparatus wherein particle form solid flows downwardly as a substantially compact column or bed.

The successful operation of processes involving continuous flow of particle form contact mass material as in the hydrocarbon conversion and catalyst regeneration steps of a continuous conversion process such as described hereinabove, requires that the rate of flow of contact material be uniform throughout the gas-solid contacting zones. When particle form solid material is discharged from the base of a vessel of large cross-sectional area through a bottom outlet having a small cross-sectional area relative to that of the vessel, the velocity of solid flow will vary widely across the vessel and will be greatest in those portions of the vessel cross-sectional area vertically above the outlet.

A major object of this invention is the provision in a vessel through which a particle form solid material flows as a substantially compact column and is withdrawn from the bottom thereof through an outlet of small cross-sectional area relative to that of said vessel, of improved apparatus adapted to provide uniform, uninterrupted downward flow of solid particles substantially across the entire cross-sectional area of said vessel.

A further object of this invention is the provision, in a continuous catalytic conversion process for hydrocarbons wherein a particle form catalyst passes cyclically through reaction and regeneration zones in each of which it moves as a substantially compact bed of an improved catalyst withdrawal means permitting a complete and uniform utilization of all the portions of the flowing bed in both the reaction and the regenration zones.

These and other objects of the invention will become apparent from the following description of the invention. Turning now to the drawings, Figure 1 is a highly diagrammatic showing of the entire cyclic setup for accomplishing the conversion of hydrocarbons in the presence of a moving column of particle form contact mass material. Figure 2 is an elevational view, partially in section of a preferred form of the invention. Figure 3 is a plan view taken at line 3—3 in Figure 2. Figure 4 is a plan view taken at line 4—4 in Figure 2. Figure 5 is a plan view taken at line 5—5 in Figure 2. All of these drawings are highly diagrammatic in form.

Turning now to Figure 1, this figure shows in highly diagrammatic form a setup of apparatus in which the invention may be practiced. This apparatus consists of a reaction chamber 10 through which there is moved as a moving column a flowing stream of particle form solid contact mass material. Hydrocarbons to be reacted, supplied to the system through pipe 11 are subjected to the charging stock preparation step indicated at 12, and from 12 flow through pipe 13 into reactor 10. The charging stock preparation step will in general consist in the main of heating the hydrocarbon stock to provide it in vapor form and at reaction temperature for entry to the reaction zone. The heating equipment used may be any of the usual forms of apparatus suitable for this purpose and will usually and preferably include a pipe still form of heater. The stock preparation step, it is also understood, may contain, if necessary, provision for separating from the material flowing through pipe 11 any portion which is not suitable for charge to reactor 10. For example, if a crude oil were charged through 11 and it was desired to pass only gas oil through pipe 13, the stock preparation step would include appropriate fractionating equipment, evaporators, vapor heaters, if necessary, and similar equipment capable of segregating from the charge only that desired portion to be converted and bringing it to the proper temperature for reaction while rejecting other portions of the original charge from the system. Reaction products from reactor 10 will be withdrawn through pipe 14 and passed to appropriate equipment for segregating and recovering products of reaction as indicated at 15. This equipment will normally be comprised of the usual setup of fractionators, gas separators, stabilizers, gas recovery systems and the like, as indicated by the necessities of the conversion in hand and will normally include provision for returning unconverted material or even other reaction products to the reactor for retreatment with or without prior passage through a stock preparation step.

It will be understood that heat exchangers and similar heat recovery arrangement may be applied at any point where necessary or appropriate.

Purge gas is introduced near the lower end of the reactor 10 through pipe 17 and may be permitted to pass up through the reactor and out with the reaction products. The solid material, substantially free of reactant vapors passes through a valve 19 or any similar device, capable of controlling the rate of passage of solid material, which device, if desired, may be so designed as to assist in the proper isolation of the reaction zone and other portions of the system. The solid then passes into elevator 20. It is therein hoisted and discharged into the top of regenerator 22, to pass therethrough as a moving column. The regeneration usually involves a contaminant combustion reaction and to effect it, regeneration medium may be introduced at 23 and withdrawn at 24. A heat exchange fluid may be introduced at 26 and passed through heat transfer tubes (not shown) within the regenerator and withdrawn at 27, so as to remove from the regenerator excess heat liberated by contaminant combustion. Regenerated contact material is withdrawn from the bottom of the regenerator through conduit 29 at a rate controlled by valve 28 and then passed to conveyor 30 by which it is conducted to a reactor supply hopper 31. The catalyst flows by gravity from supply hopper 31 through elongated feed leg 21 into the reactor 10. An inert gas such as steam or flue gas may be introduced through conduit 16 at the top of reactor 10 to help prevent escape of reactants through feed leg 21. In both the reaction and regeneration vessels it is important that the flow of contact material through said vessels be uniform across the entire vessel cross-sectional area in order to provide uniform contact of solid particles with the gaseous material. To this end, at the bottom of both the regenerator and reactor there are provided structures as discussed in the following figure.

Turning to Figure 2, there is shown a preferred construction adopted at the bottom of the regenerator 22. In Figure 2, the regenerator terminates in tapered section 42 leading to a discharge duct 29 upon which there may be mounted a valve or other control device 28. This throttling valve should be positioned at least two diameters below the upper end of duct 29 in order to insure substantially uniform solid flow across the entire area of the duct 29 at its upper end. Within the lower section of vessel 22 is disposed a partition 18 extending horizontally across the lower end of the regeneration zone or what may be termed the upper end of a connecting zone connecting the regeneration zone to the discharge duct. Below the partition 18, are spaced three other partitions 35, 36 and 37. In the uppermost partition 18 are a plurality of holes 25 substantially uniformly spaced across the partition cross-sectional area. These holes may be equal circular holes or holes of any other shape such as slots which need not be equal so long as the aperture area per unit of partition area is uniformly distributed. In the succeeding partitions 35, 36 and 37, are a progressively decreasing number of holes, which are horizontally staggered with respect to the holes in the partition next above so as to receive the proper proportion of contact material flow therefrom. In Figure 3 there is shown a view taken at line 3—3 of Figure 2 showing the hole arrangement in partitions 18 and 35. In Figure 3 may be seen partition 18 with holes 25 arranged in uniformly spaced parallel rows extending across the partition. The dotted lines represent the positioning of the holes 32 in partition 35 next below. It will be seen that the holes 32 are of such size and so arranged that each hole 32 receives the entire flow from four holes 25 in partition 18. In Figure 4 is shown the arrangement of holes 33 in partition 36 and the dotted lines show the holes 34 in partition 37 next below. It will be seen that the rows of holes in partition 36 are staggered with respect to the rows of holes in partition 35 and the arrangement of holes in partition 37 is similar with respect to holes in partition 36. The arrangement shown in Figures 3 and 4 is a preferred arrangement of vessels of rectangular cross-sectional shape. For vessels of circular cross-sectional shape, a circular row pattern or a triangular or hexagonal pattern of staggered holes or rows of holes is preferred. Dependently associated with each of the holes in partitions 35, 36 and 37 are tubes 38, 39 and 45 which should preferably be of a length equal to about twice their diameter. These tubes while not essential have been found to provide somewhat improved flow control. The length of the tubes and the spacing of the partitions should be such that a line drawn from the lower end of any tube to the hole below to which it feeds solid material should not be of a slope less than about 35–45 degrees. The conduits depending from any partition should be of sufficient total internal cross-sectional area as to allow the maximum anticipated rate of solid flow therethrough. It is generally desirable that the size of holes in successive partitions downward progressively increase since their numbers decrease. The discharge duct 29 should be positioned symmetrically with regard to the flow from the tubes 45 thereabove. It will be seen that the entire arrangement is such that a large number of comparatively small individual streams uniformly distributed are withdrawn from the bottom of the column of contact material in the regenerator and these streams are then stepwise and symmetrically combined or merged until a single discharge stream is achieved. This may be done in four steps as shown hereinabove or for smaller vessels in two or three steps or for very large vessels in more than four steps. This much of the apparatus described hereinabove has been used in commercial apparatus and is not claimed in itself as this invention. The apparatus thus far described has been found to provide a uniformity of solid flow within a vessel of large cross section never before achieved. It has been found, however, that occasionally particles of foreign matter such as pieces of asbestos insulation or refractory material find their way into the circulating stream of catalytic material. These foreign particles may be of much larger diameter than the catalyst particles and may be of sufficient size to partially or completely plug the orifices 25 in the uppermost partition 18, thereby preventing the partition and orifice arrangement from properly controlling uniform catalyst flow in all sections of the vessel cross-sectional area.

It has been found that this difficulty may be eliminated by the improvement to the above described apparatus which will now be described. Turning again to Figure 2, there is supported by suitable means across the lower section of the vessel 22 and at a fixed level above the partition 18, a perforated partition or sieve 40 having uniformly distributed perforations therein of substantially greater size than that of the catalyst particles involved but of substantially smaller size than the holes 25 in the partition 18. The partition or sieve 40 serves to retain any foreign matter which might plug the holes 25 and the retained matter may be periodically removed by entrance through manhole 41 on the vessel shell. It will be clear that a relatively small amount of foreign matter lodged in some of the holes 25 in partition 18 could close off a substantial proportion of the flow area in the vessel. On the other hand, since the total area available for solid flow through the sieve 40 is much greater than that offered by the holes 25 in partition 18, the same amount of foreign matter retained on the sieve 40 would not close off a substantial proportion of the flow area in the vessel. The intervals between shutdowns to clean the sieve 40 will, consequently, be relatively great as compared with those between shutdowns required to clean out the holes 25 in the absence of the sieve 40. Thus, by use of the sieve 40, satisfactory continuous, uniform operation over long periods of time is insured. The positioning of the partition or sieve 40 with respect to the partition 18 has been found to be of considerable importance. While the partition and hole arrangement described hereinabove serves to insure substantially uniform catalyst flow in all parts of the vessel cross section thereabove, there will exist a short zone directly above the uppermost partition wherein the catalyst flow is not uniform. The height of this zone of non-uniform catalyst flow depends upon the spacing of the holes in the uppermost partition 18 and upon the angle of internal flow of the particular catalytic material involved. The angle of internal flow may be estimated by observing the zone of catalyst flow in a vessel above a central bottom outlet having a cross-sectional area which is small relative to that of said vessel. It will be found that there is a central zone wherein catalyst flows which zone may be said to be defined roughly by the locus of revolution (about the vertical axis through the bottom outlet) of an upwardly extending curve of approximately parabolic shape. Outside of this central zone the catalyst flow will be nil. The angle of internal flow for particle form clay type catalyst falling within the size range 8–60 mesh has been found to fall within the range about 65–75 degrees. In Figure 2, the shaded areas 43 indicate the zones wherein there is substantially no catalyst flow and the line 46—46 represents the level in vessel 22 above which uniform solid flow may be expected. It has been found that if sieve 40 be positioned at a level between line 46—46 and partition 18, then the solid material will not flow through the sieve in those zones shown at 43. This means that in many cases, with the sieve in such a position, the sieve itself would offer an undesirable restriction on the solid flow. Moreover, the foreign matter retained by the sieve would be retained only in those sections thereof directly over the orifices 25 in the partition 18 therebelow. In other words, only a small portion of the sieve cross-sectional area would be available for screening out foreign matter from the moving catalyst. As a result the usable portion of the screen would be prematurely blocked by retained foreign matter; and since the catalyst could not flow through those sections of the sieve lying in the zone 43, the total flow of catalyst from the vessel would be throttled by the blocked sieve below the desired rate. When this happens, the portion of the vessel and drain leg below the sieve 40 tends to empty of catalyst thereby permitting excessive escape of reactant gas through the catalyst drain leg. It has been found that if the sieve 40 is positioned at a level above the level of the points of convergence of converging lines drawn upwardly from adjacent orifices in the uppermost partition 18 at the angle of internal flow of the catalyst involved, then the entire cross-sectional area of the sieve 40 is usable for solid flow therethrough and for retaining large particles of foreign matter from the catalyst stream. The sieve 40 may take any of a number of forms provided that the openings for solid flow therein are of smaller dimensions than the holes 25 in the uppermost partition 18 and are sufficiently large to impose substantially no resistance to the flow of catalyst particles therethrough. In a preferred form the sieve 40 may take the form of subway grating such as shown at 40 in the plan view of a section of vessel 22 taken at line 5—5.

While the improved combination of apparatus elements has been specifically described in connection with a catalyst regeneration vessel, it will be understood that the combination may be applied to a conversion vessel or to any vessel involving solid flow as a substantially compact column or bed through a gas-solid contacting zone. It will be understood that the particular details of apparatus construction and of application of this invention described hereinabove are merely exemplary in nature and are not to be construed as limiting the scope of this invention except as it may be limited in the following claims.

I claim:

1. In an apparatus for hydrocarbon conversion in the presence of a moving substantially compact column of particle form catalyst, apparatus for effecting uniform flow of catalyst across the entire cross-sectional area of said column which comprises in combination: means defining a reaction chamber, means to supply particle form catalyst to the upper end of said chamber, a discharge conduit for withdrawal of catalyst from the lower end of said chamber, said discharge conduit being of substantially less cross-sectional area than said chamber, flow throttling means on said discharge conduit, a partition extending across the lower section of said chamber; a plurality of uniformly spaced orifices in said partition arranged to subdivide said column into a plurality of uniformly spaced streams, means to proportionately converge said streams into said discharge conduit, a sieve positioned across the lower section of said chamber at a level above the level of convergence of lines drawn upwardly from the nearest edges of adjacent orifices in said partition at an angle with the horizontal equal to about 65-75 degrees, said sieve having openings therein which are uniformly distributed across the chamber irrespective of the positioning of said orifices in said partition and which are smaller in size than said orifices but of sufficient size to permit substantially unrestricted flow of said catalyst therethrough.

2. A reactor for the conversion of a reactant in the presence of a moving particle-form solid contact mass material with substantially equal exposure of all points of the contact mass comprising a chamber having a closed bottom terminating in a discharge duct, flow throttling means associated with said discharge duct, means to supply contact material to the upper portion of said chamber, means to supply reactants to said reactor and means to remove reactants therefrom, at least two horizontal vertically spaced partitioning plates across the lower portion of said chamber, the uppermost partitioning plate having a plurality of uniformly distributed apertures therein and successive partitioning plates below said first partitioning plate having progressively decreasing numbers of apertures therein, said apertures in any one of said successive partitioning plates being horizontally staggered with respect to apertures in the partitioning plate thereabove, a sieve extending across said chamber within the lower section thereof at a level which is above the level of convergence of converging lines drawn upwardly from adjacent edges of adjacent apertures in the uppermost partitioning plate at an angle with the horizontal of about 65-75 degrees, said sieve having closely spaced openings uniformly distributed therein without regards to the apertures in said uppermost partitioning plate, said openings being of sufficient size to allow free flow of the contact material therethrough but being of smaller size than the apertures in the uppermost partitioning plate.

3. In an apparatus for contacting gasiphase reactants with particle form solid contact mass materials and with substantially equal exposure of all portions of the solid material: a vessel adapted to laterally confine a substantially compact bed of downwardly moving particle from solid contact mass material, means to admit gasiphase reactant to said vessel and means to withdraw gasiphase reaction products therefrom, means to introduce said solid material to the upper end of said vessel, a plurality of superposed, transversely extending partitions spaced apart in the lower section of said vessel, said partitions dividing the lower section of said vessel into a series of superimposed chambers of substantially less height than that portion of said vessel lying thereabove, the uppermost of said partitions having a plurality of holes therein, said holes being of such size and arrangement across said partition as to provide a substantially uniform aperture cross-sectional area per unit of partition cross-sectional area entirely across said partition and the total cross-sectional area of said holes being less than that of said vessel, and each of said succeeding partitions having a gradually decreasing number of holes therethrough, said latter holes in each of said succeeding partitions being horizontally staggered between the holes in the partition directly thereabove in such a manner as to receive proportionate flow of solid from said holes thereabove, a solid material discharge conduit connected to said vessel below the lowermost of said partitions, the inlet thereof being symmetrically placed with regard to said holes in said lowermost partition, flow control means on said conduit to govern the flow rate of solid material through said vessel, and a sieve extending across the lower section of said vessel at a level above the level of convergence of converging lines drawn upwardly from the nearest edges of adjacent holes in the uppermost of said partitions at an angle with the horizontal equal to about 75 degrees, said sieve having openings therein which are of sufficient size to allow free flow of said contact material therethrough but which are smaller in size than said orifices in said uppermost partition and the openings in said sieve being closely and uniformly spaced across the sieve without regards to the position of the holes in said uppermost partition.

4. A reactor for the conversion of a reactant in the presence of a moving particle-form solid contact mass material with substantially equal exposure of all points of the contact mass comprising a chamber having a tapering lower portion terminating in a discharge duct, flow throttling means associated with said discharge duct, a series of horizontal partitioning plates in the lower portion of said chamber, the uppermost plate thereof defining the floor of a reaction space, means to supply reactants and means to withdraw reaction products associated with the chamber at a level above the uppermost partitioning plate, means to supply contact material to the upper portion of the chamber, said uppermost partitioning plate having a plurality of uniformly distributed apertures therein and successive partitioning plates below said first partitioning plate having progressively decreasing numbers of apertures therein, said apertures in any one of said successive partitioning plates being horizontally staggered with respect to apertures in the partitioning plate thereabove, and for at least one of said partitions an equalizing tube depending from the defining edge of each aperture in registering position, said equalizing tubes being of a length at least twice their diameter, a sieve extending across the lower section of said chamber at a level above the level of convergency of converging lines drawn upwardly from the nearest edge of adjacent apertures in the uppermost partitioning plate, said sieve having uniformly distributed mesh openings therein which are closely spaced without regard to the horizontal position of the apertures in said uppermost partitioning plate and which are smaller than said apertures but of sufficient size to permit free flow of the contact material therethrough.

5. A reactor for the conversion of a reactant in the presence of a moving particle-form solid contact mass material with substantially equal exposure of all points of the contact mass comprising a chamber having a tapering lower portion terminating in a discharge duct, flow throttling means associated with said discharge duct, a series of horizontal partitioning plates in the lower portion of said chamber, the uppermost plate thereof defining the floor of a reaction space, means to supply reactants and means to withdraw reaction products associated with the chamber at a level above the uppermost partitioning plate, means to supply contact material to the upper portion of the chamber, said uppermost partitioning plate having a plurality of uniformly distributed equal diameter holes therein and successive partitioning plates below said first partitioning plate having progressively decreasing numbers of equal holes of progressively increasing size therein, said holes in any one of said successive partitioning plates being horizontally staggered with respect to holes in the partitioning plate thereabove and the holes in the lowermost partitioning plate being symmetrically placed with regard to said discharge duct, conduits open at their ends dependently associated with each of the holes in the partitioning plates below the uppermost partitioning plate, said conduits terminating short of the partitioning plate below and being of length equal to at least twice their diameter, a subway grating across the lower section of said chamber at a level above the level of convergence of converging lines drawn upwardly from the nearest facing edges of adjacent holes in the uppermost partitioning plate at an angle with the horizontal equal to about 75 degrees, said grating having openings therein which are of sufficient size to allow free flow of said contact material therethrough but which are smaller in size than said holes in said uppermost partition.

GEORGE L. JOHNSON.

REFERENCES CITED

The following references are of record in the file of this patent:

UNITED STATES PATENTS

| Number | Name | Date |
| --- | --- | --- |
| 2,412,136 | Evans | Dec. 3, 1946 |